United States Patent [19]

Vora

[11] Patent Number: 4,962,181

[45] Date of Patent: Oct. 9, 1990

[54] POLYAMIDE POLYMER HAVING 12-F FLUORINE-CONTAINING LINKING GROUPS

[75] Inventor: Rohitkumar H. Vora, Westfield, N.J.

[73] Assignee: Hoechst Celanese Corp., Somerville, N.J.

[21] Appl. No.: 348,635

[22] Filed: May 8, 1989

[51] Int. Cl.$^5$ ............................................. C08G 69/26
[52] U.S. Cl. ..................................... 528/183; 528/26; 528/27; 528/28; 528/33; 528/128; 528/172; 528/188; 528/229; 528/335; 528/337; 528/348
[58] Field of Search .............. 528/183, 335, 348, 229, 528/128, 188, 337, 172, 26, 27, 28, 33

[56] References Cited

FOREIGN PATENT DOCUMENTS 0115337 9/1981 Japan .

Primary Examiner—Harold D. Anderson
Attorney, Agent, or Firm—Perman & Green

[57] ABSTRACT

The present invention provides novel heat stable polyamide polymer having excellent flow properties which render them more readily processible into fibers, films, sheets and other molded articles. The polymers are prepared by forming the polycondensation product of one or more aromatic diamines and one or more aromatic dibasic acid monomers or amide-forming derivatives thereof, at least one of said diamine monomers having the structure:

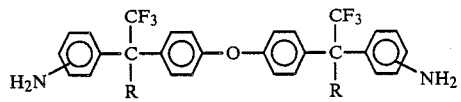

where R is $CF_3$ or phenyl. The polyamides of this invention exhibit improved solubility and low temperature flow characteristics, low moisture uptake, high thermal stability, low dielectric constant and good hydrolytic stability.

15 Claims, No Drawings

POLYAMIDE POLYMER HAVING 12-F FLUORINE-CONTAINING LINKING GROUPS

BACKGROUND OF THE INVENTION

1. Field of the Invention

The present invention relates to aromatic polyamide polymers based on an amino-monomer containing two hexafluoro-isopropylidine linking groups or two 1-phenyl-2,2,2-trifluorethane linking groups, which polymers have improved physical, mechanical and chemical properties, and to a method for preparing such polymers.

2. Description of Related Art

Polyamide condensation products of a fluorine-containing diamine such as 2,2-bis(4-aminophenyl) hexafluoropropane (hereinafter referred to a 4,4'6F-Diamine) and the chlorocarbonyl derivatives of dibasic aromatic acids are known in the art and are described in U.S. Pat. No. 3,328,352.

Included in the polyamides prepared in accordance with this patent are the reaction products of 4,4'-6F-Diamine and the acid halide derivatives of isophthalic acid, terephthalic acid and 2,2-bis(4-carboxyphenyl) hexafluoropropane. These polymers are characterized as having good high temperature properties and are disclosed to be useful in the production of fibers and films.

One of the problems associated with such polymers is that they exhibit relatively poor flow properties which render them difficult to process, particularly to injection mold or to spin into fibers. These polymers are also relatively hydrophilic and tend to absorb moisture which can effect their clarity, heat stability, processability, mechanical and electrical properties.

Copending application Ser. No. 316,254 filed in the USPTO on Feb. 27, 1989 discloses polyamide-imide polymers based on the polymer condensation product of a mixture of trimellitoyl anhydride chloride and at least one diamine selected from the group consisting of 4,4'-bis[4-(aminophenoxyphenyl) hexafluoroisopropyl] diphenyl ether, 4,4'-bis [2-(4-aminophenyl) hexafluoroisopropyl] diphenyl ether and 4,4'-bis [2-(3-aminophenyl) hexafluoroisopropyl] diphenyl ether.

These amino monomers contain two hexafluoroisopropylidene linking groups and are referred to under the category of 12F-Diamines. The polyamide-imide polymers prepared according to the above mentioned application have outstanding flow properties, good thermal properties and good solubility in aprotic organic solvents.

Polyamides prepared from so called 12-F monomers are disclosed in Applicants copending applications Ser. No. 124,744 and Ser. No. 124,634 filed in the USPTO on Nov. 24, 1987, now U.S. Pat. Nos. 4,822,868 and 3,845,183 respectively. These polymers may be prepared by forming the polymer condensation product of an aromatic diamine and 4,4'-bis[2-(4-chlorocarbonylphenyl) hexafluoroisopropyl] diphenyl ether Ser. No. 124,744 or the polymer condensation product of a hydroxy substituted or alkoxy substituted 12F-Diamine such as 4,4'-bis[2-(3-amino-4-hydroxyphenyl) hexafluoroisopropyl] diphenyl ether and a dibasic acid chloride such as isophthaloyl chloride, terephthaloyl chloride or 4,4'-bis[2-(4-chlorocarbonylphenyl) hexafluoroisopropyl] diphenyl ether Ser. No. 124,634. The latter application also discloses the preparation of polybenzoxazole polymers by heat treating the alkoxy or hydroxy substituted polyamides.

Similarly, copending application Ser. No. 124,704 filed in the USPTO on Nov. 24, 1987, discloses polyamide polymers prepared by forming the polymer condensation produce of a 12F-Diamine such as 4,4'-bis[(4-aminophenoxyphenyl)hexafluoroisopropyl] diphenyl ether with one or more diacids or diacid halides. The polyimides are also characterized as having improved solubility in organic solvents, low dielectric constants, superior thermal and thermooxidative stability and improved processing characteristics.

All of the aforementioned patent applications and their disclosures are incorporate herein by reference.

SUMMARY OF THE INVENTION

The present invention provides novel heat stable polyamide polymers having excellent flow properties which render them more readily processible into fibers, films, sheets and other molded articles. The polymers are prepared by forming the polycondensation product of one or more aromatic diamines and one or more dibasic acid monomers or amide-forming derivatives thereto, at least one of said diamine monomers having the structure:

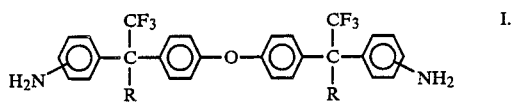

wherein R is CF$_3$ or phenyl. The polyamides of this invention exhibit improved solubility and low temperature flow characteristics, low moisture uptake, high thermal stability, low dielectric constant and good hydrolytic stability.

DETAILED DESCRIPTION OF THE INVENTION

The polyamides of this invention may be characterized as containing structural units of the formula:

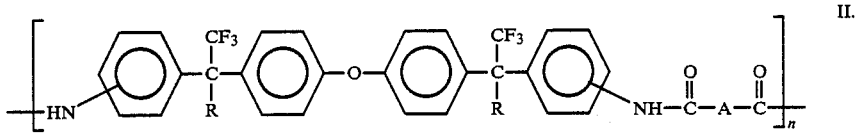

wherein R is CF$_3$ or phenyl, n is a number sufficient to give rise to a polymer having an inherent viscosity of at least about 0.05 as measured from a solution of the polymer in dimethyl acetamide at 25° C. at a polymer concentration of 0.5 weight percent and A is a devalent aromatic organic radical selected from alkylene, phenylene, naphthalene, bis or polyphenylene type compounds.

Preferably A in formula II comprises a phenylene, naphthalene or a bis-phenylene type compound, or a mixture of such compounds, all of which may be unsubstituted or substituted with halogen, hydroxy, C$_1$ to C$_6$ alkyl or $C_1$–$C_6$ alkoxy groups, n is a number sufficient to provide an inherent viscosity of at least about 0.1 dl/g as measured from a solution of the polymer in dimethylacetamide at 25° C. at a polymer concentration of 0.5 weight percent, and R is $CF_3$.

The polyamide polymers of this invention are those prepared using 12F-Diamine monomers such as 4,4'bis [2-(4-aminophenyl) hexafluoroisopropyl] diphenylether, and 4,4'-bis[2-(3-aminophenyl) hexafluoroisopropyl] diphenyl ether.

The polymers of the invention containing structural units of Formula II may be prepared by the condensation polymerization of a diamine of the structure of Formula I above with a dicarboxylic acid, an acid halide of a dicarboxylic acid or the lower alkyl or phenyl esters of a dicarboxylic acid, preferably an aromatic dicarboxylic acid halide. Typical acid halides useful in the practice of the invention may be presented by the following formula:

$$\text{halo-}\overset{O}{\underset{\|}{C}}-A-\overset{O}{\underset{\|}{C}}\text{-halo}$$

wherein A represents a divalent alkylene, alicyclic or aromatic moiety, preferably an aromatic moiety selected from:

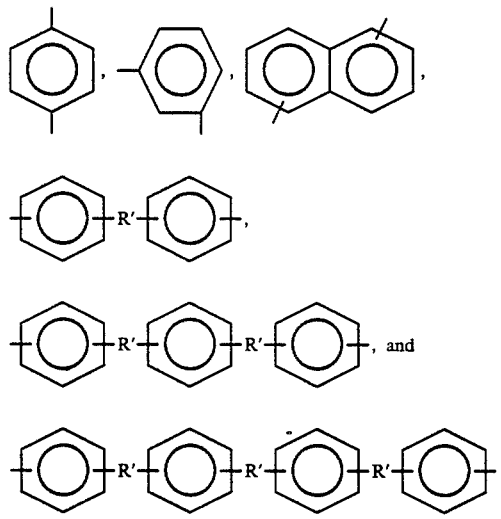

wherein R' is a divalent moiety independently selected from a covalent carbon to carbon bond, methylene, ethylene, propylene, isopropylene, dichloro and difluoroalkylenes up to 3 carbons, hexafluoroisopropylidene, 1-phenyl-2,2,2-trichloroethylidene, oxy, thio, sulfinyl, sulfonyl, sulfonamido, carbonyl, oxydicarbonyl, oxydimethylene, sulfonyldioxy, carbonyldioxy, silanylene, disilanylene, polysilanylene up to 8 Si atoms; siloxanylene, disiloxanylene, and a polysiloxanylene up to 8 Si atoms. Preferably, the linking group R' is selected from oxy, hexafluoroisopropylidene, carbonyl, methylene, a covalent carbon to carbon bond, siloxanylene, disiloxanylene and polysiloxanylenes, most preferably, hexafluoroisopropylidene, 1-phenyl-2,2,2-trifluoroethylidene and oxy.

The hydrogen atoms of the linking group A and/or R, may be substituted by one or more non-interferring monovalent substituents such as chloro, fluoro, lower alkyl up to 6 carbons and phenyl. Also as used herein, the terms "aromatic" and "alicyclic" are meant to include heteroaromatics and heteroalicyclics wherein one or more of the ring carbon atoms have been replaced with —O—, —S—, or —N— atoms.

Illustrative aromatic dicarboxylic acids and/or its acid halide derivatives useful in the practice of the invention include the acids or acid halide derivatives of:
isophthalic acid;
phthalic acid;
terephthalic acid;
1,4-phenylenediethanoic acid;
3,3'-biphenyl dicarboxylic acid;
4,4'-biphenyl dicarboxylic acid;
1,1-bis(4-carboxyphenyl)-1-phenyl-2,2,2,-trifluoroethane;
3,3'-dicarboxy diphenyl ether;
4,4'-dicarboxy diphenyl ether;
bis-(4-carboxyphenyl) methane;
bis-(4-carboxyphenyl)-methyl phosphane oxide;
bis-(3-carboxyphenyl)-sulfone;
4,4'-dicarboxytetraphenylsilane;
bis(3-carboxyphenyl)-sulfone;
bis(4-carboxyphenyl)-sulfone;
5-tertiary butyl isophthalic acid;
5-bromoisophthalic acid;
5-fluoro-isophthalic acid;
5-chloroisophthalic acid;
2,2-bis-(3-carboxyphenyl) propane;
2,2-bis-(4-carboxyphenyl) propane;
4,4'-(p-phenylenedioxy) dibenzoic acid;
2,6-naphthalene dicarboxylic acid;
4,4'-para-phenylenedioxy dibenzoic acid;
4,4'-bis[2-(4-carboxyphenyl) hexafluoroisopropyl] diphenyl ether;
bis(3-carboxyphenyl) sulfide;
bis(4-carboxyphenyl) sulfide;
1,4-phenylene diethanoic acid;
1,4-bis(4-carboxyphenoxy) phenylene;
2,2-bis(4-carboxyphenyl) hexafluoropropane;
2,2-bis(3-carboxyphenyl) hexafluoropropane;
2,2-bis[4-(4-carboxyphenoxy) phenyl] hexafluoropropane;
1,1-bis[4-(4-carboxyphenoxy) phenyl]-1-phenyl-2,2,2-trifluoroethane;
and mixtures thereof.

The moiety A may also be selected from an alkylene moiety having from one to twenty carbons or an alicyclic moiety of four to eighteen carbons. Illustrative compounds of this class of dicarboxylic acid halides include those of the following dicarboxylic acids:
1,4-cyclohexane dicarboxylic acid:
1,3-cyclopentane dicarboxylic acid;
oxalic acid;
1,2-cyclobutane dicarboxylic acid;
1,4-cyclohexane diacetic acid;
malonic acid;
pentanedioic acid;
hexanedioic acid;
2,4-furandicarboxylic acid;
1,10-decanedicarboxylic acid;
1,12-dodecanedicarboxylic acid;
succinic acid;
1,18-octadecanedicarboxylic acid;
glutaric acid;
2,6-cyclohexane dipropionic acid;
adipic acid;
2,6-cyclohexane dihexanoic acid;

and mixtures thereof.

Polyamide copolymers may also be prepared using a mixture of the diamine of Formula I above and at least one other aromatic diamine having the formula:

$$NH_2-B-NH_2$$

wherein B is an aromatic moiety of a phenylene, napthalene or bis-phenylene type compound which may be unsubstituted or ring substituted with halogen, hydroxy, $C_1$ to $C_6$ alkyl or $C_1$ to $C_4$ alkoxy groups.

Illustrative of diamines which are suitable for use in a copolymerization admixture with the diamine of Formula I include:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl)sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4,-diamino-biphenyl;
3,3'-dimethyl-4,4,-diamino-biphenyl;
3,4'-dimethyl-4,4,-diamino-biphenyl;
3,3'-dimethoxy-4,4,-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,7-diamino-naphthalene;
8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4,-diamino-biphenyl;
3,3'-dimethyl-4,4,-diamino-biphenyl;
3,4'-dimethyl-4,4,-diamino-biphenyl;
3,3'-dimethoxy-4,4,-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
2,2-bis(3-amino-4-methylphenyl)hexafluoropropane
2,2-bis(4-amino-3-methylphenyl)hexafluoropropane
2,2-bis(3-amino-4,5-dimethylphenyl)hexafluoropropane
2,2-bis(4-amino-3,5-dimethylphenyl)hexafluoropropane
1,3-diamino-adamantane;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl) hexafluoropropane;
2,2-bis[4-(4-aminophenoxy)phenyl] hexafluoropropane;
2,2-bis[4-(2-chloro-4-aminophenoxy)phenyl hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,3-bis(3-aminophenyl) hexafluoropropane;
1,5-bis(3-aminophenyl) decafluoropentane;
4,4'-bis[2-(4-aminophenoxyphenyl) hexafluoropropyl]-diphenyl ether;
and mixtures thereof.

Polyamide polymers may also be prepared in accordance with this invention wherein both a mixture of the above diamines and a mixture of the above diacids or amide-forming derivatives are reacted.

The most preferred polyamide polymers of this invention are prepared by forming the polymeric condensation product of the diamine of Formula I above with one of the following diacid chlorides: isophthaloyl chloride; terephthaloyl chloride; 2,2-hexafluoro-bis(4-chlorocarbonyl phenyl) propane; 4,4'-bis[2-(4-chlorocarbonylphenyl) hexafluoroisopropyl] diphenyl ether; 4,4'-para-diphenyl ether dibenzoyl chloride; 4,4'-para-phenylenedioxy dibenzoyl chloride; 2,6-naphthalene diacid chloride; and mixtures of two of these.

The diacid and diamine reactants, particularly the monomers containing fluorine, are preferably substantially electronically pure and are referred to as electronic grade monomers. They generally should be at least about 99.5% pure. In the preferred embodiment, the diamine and diacid monomers are reacted in approximately equi-molar amounts.

The polyamides of the present invention are preferably prepared by a solution polymerization process, i.e., by reacting the diacid and diamine monomers in an appropriate solvent, optionally in the presence of a catalyst such as triethylamine or an added inorganic salt such as lithium chloride or calcium chloride, and in a nitrogen atmosphere. Polymerization is conducted under anhydrous, isothermal polymerization conditions and preferably at a temperature of less than 50° C. The polymer may be recovered by precipitation in water or an alcohol such as methanol, and washed.

The solvents useful in the solution polymerization process for synthesizing the polyamide compositions are the organic solvents whose functional groups do not react with the reactants to any appreciable extent. In addition to being inert to the system, and preferably, being a solvent for the polyamide, the organic solvent must be a solvent for at least one of the reactants, preferably for all of the reactants. The normally liquid organic solvents of the N,N,-dialkylcarboxylamide class are useful as solvents in the process. The preferred solvents are the lower molecular weight members of this class, particularly N,N-dimethylformamide, dimethylacetamide, N,N-diethylacetamide, N,N-dimethylmethoxyacetamide, N-methyl caprolactam, and the like. Other solvents which may be used include dimethylsulfoxide. N-methyl-2-pyrrolidone, tetramethyl urea, pyridine, dimethylsulfone, tetramethyl urea, dimethylsulfone, hexamethylphosophoramide, tetramethylene sulfone, formamide, N-methylformamide, butyro-lactone and phenols such as m-cresol. The solvents can be used alone or in combination.

To obtain the maximum inherent viscosity, i.e., maximum degree of polymerization, for any particular combination of monomers, solvent, etc., and thus produce shaped articles such as films and filaments of optimum toughness, it has been found that the temperature throughout the reaction should be maintained below 50° C., preferably below about 35° C.

The degree of polymerization of the polyamides is subject to deliberate control. The use of equimolar amounts of the reactants under the prescribed conditions provides polyamides of high molecular weight. The use of either reactant in large excess limits the extent of polymerization. In addition to using an excess of one reactant to limit the molecular weight of the polyamides, a chain terminating agent such as phthalic anhydride or a mono amine may be used to "cap" the ends of the polymer chains. Typical useful capping agents are monoanhydrides or monoamines such as phthalic anhydride, aniline or p-methylaniline. Preferred weight average molecular weights of the polyamides range from at least about 5,000 up to about 100,000 or more.

In the preparation of the polyamides, it is desired that the molecular weight be such that the inherent viscosity of the polymer is at least about 0.05, more preferably from about 0.1 to about 2.0. The inherent viscosity is measured at 25° C. at a concentration of 0.5% by weight of the polymer in a suitable solvent such as dimethylacetamide.

The quantity of organic solvent used in the process need only be sufficient to dissolve enough of one reactant, preferably the diamine, to initiate the reaction of the diamine and the other monomer or monomers It has been found that the most successful results are obtained when the solvent represents at least 60% by weight of the final solution, that is, the solution should contain 0.05–40% of the polymeric component, more preferably 10 to 25%.

The following examples are illustrative of the invention:

EXAMPLE 1

This Example details the preparation of a polyamide based on the polymer condensation product of 0.01 moles of 4,4'-bis[2-(4-aminophenyl) hexafluoroisopropyl] diphenyl ether (12F-Diamine) and 0.01 moles of 2,2-bis(4-chlorocarbonylphenyl)hexafluoropropane (6F-Diacid Chloride) to yield a polyamide polymer having the following structure:

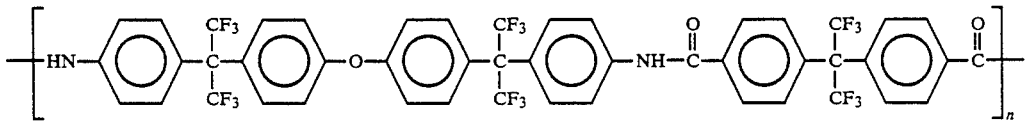

A 250 ml 3 neck flask fitted with a stirrer, condenser, Y tube, powder addition funnel, thermometer, dry ice acetone cooling bath and nitrogen blanket was charged under nitrogen atmosphere with 5.005 grams (0.01 mole) of 12F-Diamine along with 40 grams of reagent grade dimethylacetamide (DMAC). The mixture was stirred to dissolve the diamine and cooled down to a temperature of about −10° C. A clear solution was obtained. 4.33 grams (0.01 mole) of 6F-Diacid chloride was then gradually added to this solution over a period of about 12 minutes time while continuing agitation and maintaining a temperature of about −10° C. under nitrogen atmosphere. The beakers containing the reactants were rinsed with 44 grams of additional DMAC and this was also added to the polymerization solution The mixture was then agitated for ½ hour at −4° C., after which 1.12g of triethyl amine was added dropwise over a period of about 3 minutes. The mixture was agitated for an additional hour at 0° C. after which the temperature was allowed to rise to 15° C. 8 grams of pyridine was charged to the reaction mixture and the mixture was then agitated for 18 hours at 20°-25° C. The pyridine hydrochloride salt was then filtered out from the mother liquor. The resulting polyamide was precipitated and washed with deionized water and dried overnight in a vacuum oven at 60° C. 8 grams of solid polyamide was obtained.

The resulting polyamide was soluble in NMP, DMAC tetrahydrofurane, acetone, methyl ethyl ketone, diglyme, butyrolactone and other aprotic solvents A cast film of the polyamide polymer was prepared by forming a 25% by weight solution in a 50/50 mixture of butyrolactone and diglyme and drawing down the solution on a glass plate. The cast film was then dried in an air circulating oven by heating it stepwise from about 20° C. to about 300° C. over a period of about 6 hours. The resulting film was self-supporting, flexible, clear and transparent. The resulting polymer had the following properties:

| Inherent Viscosity | |
|---|---|
| (0.5% soln in DMAC) | 0.32 dl/g. |
| weight average Mw | 34,526 |
| number average Mn | 20,375 |
| polydispersity (Mw/Mn) | 1.7 |
| DSC (Tg° C.) | 238° C. |
| TGA (5% loss at °C.) | 480° C. |

EXAMPLE 2

This example illustrates the preparation of a polyamide based on the polymer condensation product of 12F-Diamine and terephthaloyl chloride.

The process of Example 1 was repeated as set forth therein except that the following materials and quantities were employed.

| Terephthaloyl Chloride | 2.05 | g (0.01 mole) |
|---|---|---|
| 12F-Diamine | 5.005 | g (0.01 mole) |
| DMAC | 83.0 | g |
| Triethylamine | 1.12 | g |
| Pyridine | 8.0 | g |

Polymerization was conducted and sequential addition of the above reactants and materials and polymer recovery was as set forth in Example 1.

The resulting polyamide polymer had an Inherent Viscosity of 0.25 dl/g measured at 25° C. as a 0.5% by weight solution in DMAC.

The molecular weight of the polymers, whether weight average molecular weight ($M_w$) or number average molecular weight ($M_n$) is measured by gel permeation chromatography (GPC) performed on dilute solutions of the polymer in tetrahydrofuran (THF). The actual apparatus employed 10 consisted of Waters (Millipore Corporation) programmable automatic sampler, vacuum pump, chromatography columns with heater, and a differential refractometer connected to a Shimadzu CR 30A data reduction system with accompanying software (version 1.1, Shimadzu part No. T/N 22301309-91). The refractometer used was a Waters model 410 and four chromatography columns, 500 Angstron, 1000 Angstron, 10,000 Angstron, and 100,000 Angstron (available from Waters) were connected in series.

The system was calibrated using multiple available polystyrene standards ranging in molecular weight as follows:

| GPC CALIBRATION | |
|---|---|
| Calibration Standard (Polystyrene) | Mol. Wt. |
| 1 | 470,000 |
| 2 | 170,000 |
| 3 | 68,000 |
| 4 | 34,500 |
| 5 | 9,200 |
| 6 | 3,200 |
| 7 | 1,250 |

The standards are essentially monodisperse, consisting substantially of a single molecular weight. With the system thus calibrated the relative weight average molecular weight $M_w$, the number average molecular weight $M_n$, and polydispersity (d), $M_w/M_n$ were obtained for polymers produced in accordance with the Examples given hereinabove.

Glass transition temperatures ($T_g$) were determined by differential scanning calorimetry using a Perkin Elmer DSC-4 calorimeter operating at 20° C./min., nitrogen atmosphere at 60 cc/min. Glass transition temperature by this method is generally defined as the point of intersection of tangent lines about the point of first inflection of the heating curve of the polymer. Thermogravimetric analysis (TGA) was performed with a Perkin Elmer 65-w analyzer at 20° C./min. with an air rate of 80 cc/min. TGA values given herein are for five percent weight loss; in other words, the temperature at which 5% weight loss is observed is reported.

The polyamides of the present invention may be used as solutions in organic solvent to produce films, fibers coatings, composites and the like.

The polyamides may be molded using techniques such as compression molding or injection molding to produce melt fabricated articles such as fibers, films, safety masks, windshields, electronic circuit substrates, airplane windows or the like. They may be compounded with graphite, graphite fiber, molybdenum disulphide or PTFE for the production of self-lubricating wear surfaces useful for piston rings, valve seats, bearings and seals. They may also be compounded into molding compounds for high strength structural components such as jet engine components. The polyamides may also be compounded with friction materials to produce molding compounds for high temperature braking components or with abrasive materials such as diamonds for high speed grinding wheels.

The polyamides may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and photoresist coatings useful in microelectronic processing.

The polyamides may also be used to produce high temperature adhesives for bonding aerospace structures or electrical circuitry, conductive adhesives when mixed with conductive fillers such as silver or gold for microelectronic applications, or adhesives for glass, metal or plastic substrates.

The polyamides may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A polyamide polymer or copolymer containing at least one structural unit of the formula:

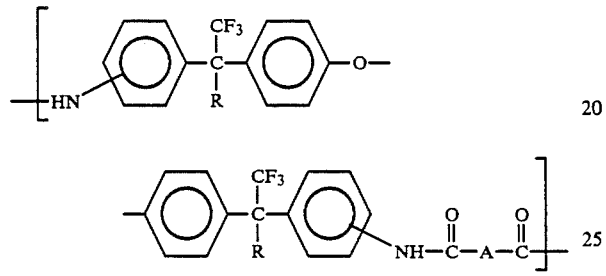

wherein R is selected from the group consisting of CF$_3$ and phenyl and A is a divalent organic, radical selected from alkylene, phenylene, naphthalene, or a bis or polyphenylene, said polyamide having a weight average molecular weight of at least about 5,000.

2. The polymer of claim 1 wherein A is selected from the group consisting of phenylene, naphthalene, a bis-phenylene of mixtures thereof, which are unsubstituted or ring substituted with a radical selected from the group consisting of halogen, hydroxy, C$_1$ to C$_6$ alkyl and C$_1$ to C$_6$ alkoxy.

3. The polymer of claim 1 prepared by forming the polyamide condensation product of a 4,4-bis[2-(aminophenyl) hexafluorisopropyl] diphenyl ether with one or more dicarboxylic acids or amide-forming derivatives thereof.

4. The polymer of claim 3 wherein said acid derivative is selected from the group consisting of isophthaloyl chloride; terephthaloyl chloride; 2,2-hexafluoro-bis(4-chlorocarbonyl phenyl) propane; 4,4'-bis[2-(4-chlorocarbonylphenyl) hexafluoroisoprbpyl] diphenyl ether; 4,4'-para-diphenyl ether dibenzoyl chloride; 4,4'-para-phenylenedioxy dibenzoyl chloride; 2,6-naphthalene diacid chloride; or mixtures thereof.

5. The polymer of claim 1 wherein R is CF$_3$.

6. A polyamide polymer containing structural units of the formula:

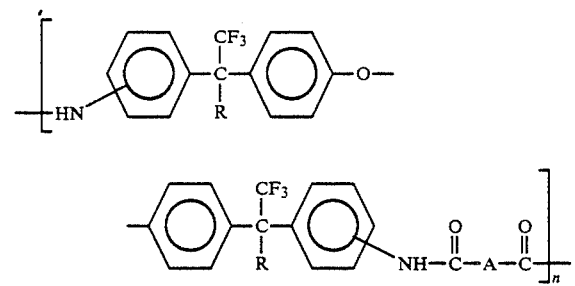

wherein R is selected from the group consisting of CF$_3$ and phenyl, A is a divalent organic radical selected from alkylene, phenylene, naphthalene, or bis or polyphenylene and n is a number corresponding to a polymer having an inherent viscosity of at least about.; 0.05 as measured from a 0.5% by weight solution of the polymer in dimethyl acetamide at 25° C.

7. The polymer of claim 6 wherein A is selected the group consisting of phenylene,naphthalene, a bis-phenylene or mixtures thereof, unsubstituted or ring substituted with a radical selected from the group consisting of halogen, hydroxy, C$_1$ to C$_6$ alkyl and C$_1$ to C$_6$ alkoxy.

8. The polymer of claim 6 prepared by forming the polyamide condensation product of a 4,4-bis[2-aminophenyl) hexafluoroisopropyl] diphenyl ether with one or more dicarboxylic acids or amide-forming derivatives thereof.

9. The polymer of claim 8 wherein said acid derivative is selected from the group consisting of isophthaloyl chloride; terephthaloyl chloride; 2,2-hexafluoro-bis(4-chlorocarbonyl phenyl) propane; 4,4'-bis[2-(4-chlorocarbonylphenyl) hexafluoroisopropyl] diphenyl ether; 4,4'-parapdiphenyl ether dibenzoyl chloride; 4,4'para-phenylenedioxy dibenzoyl chloride; 2,6-naphthalene diacid chloride; and mixtures thereof.

10. The polymer of claim 8 wherein said acid derivative is an acid halide having the structure:

wherein A represents an aromatic moiety selected from a group consisting of:

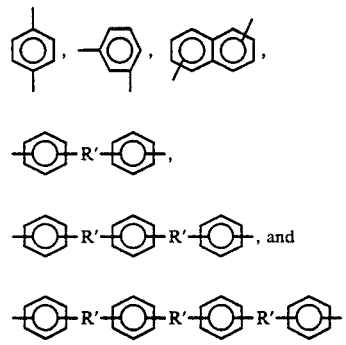

wherein R' is a covalent bond or R' represents a divalent moiety independently selected from methylene, ethylene, propylene, isopropylene, dichloro or difluoroalkylenes up to 3 carbons, hexafluoroisopropylidene, 1-phenyl-2,2,2-trichloroethylidene, oxy, thio, sulfinyl, sulfonyl, sulfonamido, carbonyl, oxydicarbonyl, oxydimethylene, sulfonyldioxy, carbonyldioxy, silanylene, disilanylene, polysilanylene up to 8 Si atoms; siloxanylene, disiloxanylene, or a polysiloxanylene up to 8 Si atoms 11. The polymer of claim 10 wherein said acid derivative is 2,2-bis(4-chlorocarbonylphenyl) hexafluoropropane.

12. The polymer of claim 11 wherein said diphenyl ether is 4,4'-bis[2-(4-aminophenyl) hexafluoroisopropyl] dyphenyl ether.

13. The polymer of claim 6 wherein R is CF$_3$.

14. The polymer of claim 3 or 8 wherein said diamine is 4,4'-bis [2-(4-aminophenyl) hexafluoroisopropyl] diphenylether.

15. A film comprising the polymer of claim 1 or claim 6.

* * * * *